United States Patent [19]

Temme

[11] 4,282,968
[45] Aug. 11, 1981

[54] SCRAPER-CHAIN CONVEYOR CHANNEL SECTION

[75] Inventor: Helmüt Temme, Waltrop, Fed. Rep. of Germany

[73] Assignee: Gewerkschaft Eisenhütte Westfalia, Lünen, Fed. Rep. of Germany

[21] Appl. No.: 66,275

[22] Filed: Aug. 13, 1979

[30] Foreign Application Priority Data

Aug. 18, 1978 [DE] Fed. Rep. of Germany ....... 2836132

[51] Int. Cl.$^3$ ............................................. B65G 19/28
[52] U.S. Cl. ................................................ 198/735
[58] Field of Search .................. 198/735, 861; 299/34, 299/43, 64

[56] References Cited

U.S. PATENT DOCUMENTS

| | | | |
|---|---|---|---|
| 2,633,230 | 3/1953 | Duncan | 198/735 X |
| 2,818,164 | 12/1957 | Dommann | 198/735 X |
| 4,098,396 | 7/1978 | Stoppani et al. | 198/735 X |
| 4,108,495 | 8/1978 | Hauschopp et al. | 299/43 |
| 4,157,751 | 6/1979 | Gründken et al. | 198/735 |

FOREIGN PATENT DOCUMENTS

| | | | |
|---|---|---|---|
| 498316 | 1/1951 | Belgium | 198/735 |
| 723313 | 2/1955 | United Kingdom | 198/735 |
| 1405095 | 9/1975 | United Kingdom | 198/861 |

Primary Examiner—James L. Rowland
Attorney, Agent, or Firm—Neil F. Markva

[57] ABSTRACT

A channel section for a scraper-chain conveyor has a lower trough-shaped part and an upper trough-shaped part detachably fixed thereto. The lower part is made of heavy-duty metal plate and supports a plough guide section. The upper part is made of light, rolled metal sections and is easily replaceable. The lower part has a pair of side walls welded to a base plate. The base plate has an extension which projects outwardly of the face-side side wall and toward the face being won. The extension constitutes a guide rail along which the plough can slide. A ramped cover plate is pivotally attached to the free end of one arm of an L-shaped plate. The other arm of the L-shaped plate is welded to the face-side side wall so that the plate overlies the guide rail. The guide rail constitutes the plough guide section together with the cover plate and its support plate.

18 Claims, 4 Drawing Figures 4,282,968

SCRAPER-CHAIN CONVEYOR CHANNEL SECTION

BACKGROUND TO THE INVENTION

This invention relates to a scraper-chain conveyor and to a channel section thereof.

A scraper-chain conveyor conventionally includes a plurality of channel sections joined end-to-end in such a manner as to permit limited actuation in all directions. Each channel section has a pair of side walls between which is welded a plate which defines the conveying surface and separates the two runs of the scraper assembly.

It is known to make each of the channel sections of such a scraper-chain conveyor in two trough-shaped parts. The lower trough-shaped part defines the lower run of the scraper assembly, and the upper trough-shaped part defines the conveying surface and the upper run of the scraper assembly. (See DE-PS No. 573 972, DE-PS No. 922 754, DE-PS No. 848 029 and "Glück-auf" 1977, page 704).

Scraper-chain conveyors of this type are relatively light installations made of profiled sheet-metal sections. They are not capable of resisting the heavy loads encountered in modern heavy-duty mining installations having a winning machine (such as a plough) guided along the conveyor.

SUMMARY OF THE INVENTION

The present invention provides a scraper-chain conveyor channel section comprising a lower, trough-shaped part, and an upper, trough-shaped part detachably connected to the lower part. The lower part includes a pair of side walls firmly connected together, and a plough guide section is firmly attached to the lower part.

By making the lower part of heavy duty metal plate, there is sufficient support for the forces transmitted through the plough guide section. The upper part can be made of light, rolled metal sections which are readily replaceable.

Advantageously, the side walls of the lower part are firmly connected together by means of a base plate. The lower part of the channel section is then completely closed off, at the bottom by the base plate, at the sides by the side walls, and at the top by the upper part. Consequently, when the channel section is advanced there is practically no chance of fine material, such as coal dust, getting into the lower part. Preferably, the side walls are welded to the base plate.

The base plate preferably extends outwardly beyond one of the side walls of the lower part, the base plate extension constituting part of the plough guide section. The base plate extension thus forms a guide rail along which the plough can slide. It can also constitute the means for limiting the depth of cut of the plough. Advantageously, a guide member is firmly attached to the lower part, the guide member constituting part of the plough guide section. Preferably, the guide member is firmly attached to said one side wall above the base plate extension. The guide member may be constituted by an L-shaped plate, one arm of which is welded to said one side wall, and a ramped cover plate pivotally attached to the free end of the other arm of the L-shaped plate. Conveniently, the base plate and the side walls of the lower part, as well as the L-shaped plate, are made of heavy-duty metal plate.

The upper part may have a pair of side walls connected together by means of a floor plate. The side walls of the upper part may be welded to, or integral with, the floor plate. Preferably, the upper part is made of light, rolled metal sections.

Advantageously, the upper, free ends of the side walls of the upper part include outwardly-extending flanges which, in use, rest on the upper edges of the side walls of the lower part. Preferably, the upper part is detachably connected to the lower part by means of co-operable members associated with the outwardly-extending flanges of the upper part and with the side walls of the lower part. At least some of said co-operable members may be bolts associated with the side walls of the lower part and threaded holes formed in the outwardly-extending flanges of the upper part. Conveniently, the bolts are housed in pockets formed in the side walls of the lower part, the pockets being open toward the inside of the channel section and are covered, in use, by the side walls of the upper part. Some of said co-operable members may be spigots projecting downwardly from said flanges and spigot-holes formed in the upper edges of the side walls of the lower part.

The invention also provides a scraper-chain conveyor comprising a plurality of channel sections joined together end-to-end, wherein each channel section is as defined above.

Advantageously, each pair of adjacent channel sections are articulatedly joined together by means of connectors associated with the side walls of the lower parts. Preferably, each connector is housed in correspondingly-shaped pockets formed in the adjacent portions of the respective side walls of the respective lower parts. Conveniently, said pockets are open toward the inside of the channel sections. Each connector has a central shank portion with an enlarged head portion at each end thereof.

Locking means hold the connectors in position. Preferably, each upper part includes two bars running respectively along the under side of its side walls, the bars overlying, in use, the pockets housing the connectors thereby constituting said locking means.

BRIEF DESCRIPTION OF DRAWINGS

A scraper-chain conveyor constructed in accordance with the invention will now be described, by way of example, with reference to the accompanying drawings, in which.

DESCRIPTION OF PREFERRED EMBODIMENT

Figure 1:
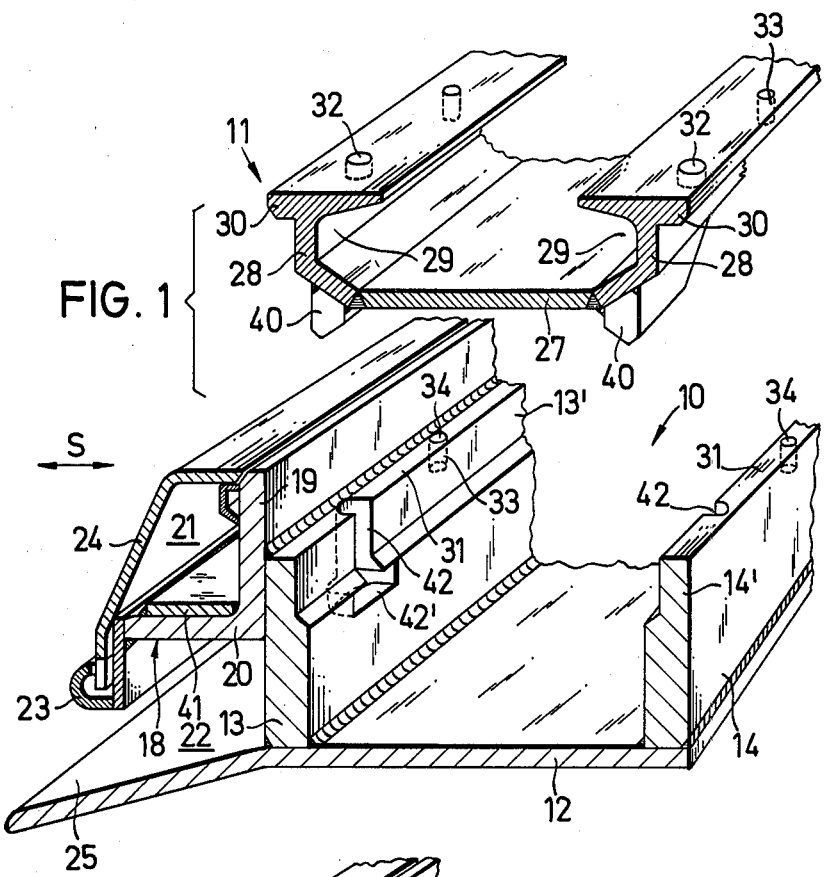
FIG. 1 is an exploded perspective view of part of a channel section of the conveyor.
Figure 2:
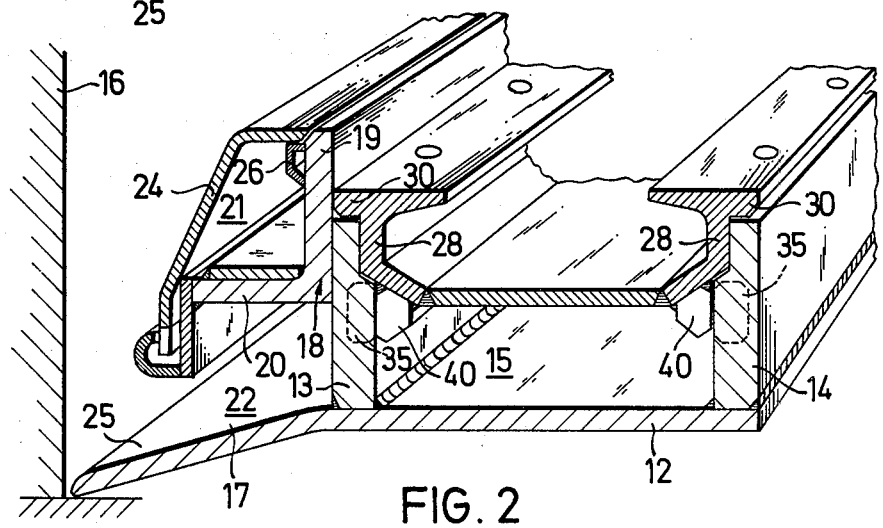
FIG. 2 is a perspective view of that part of the channel section shown in FIG. 1.

Referring to the drawings, FIGS. 1 and 2 show part of one channel section of a scraper-chain conveyor, the other channel sections being identical to the illustrated channel section. The channel section is of two-part construction, comprising a lower part 10, which defines the lower run of the scraper assembly (not shown), and an upper part 11 which defines the upper run of the scraper assembly. The upper part 11 is detachably connected (in a manner described below) to the lower part 10 for easy replacement. The lower part 10 includes a base plate 12 and a pair of side walls 13 and 14, the side walls being welded or otherwise fixedly connected to the base plate. The base plate 12 and the side walls 13 and 14 thus define a trough-shaped member which encloses the lower run 15 of the scraper assembly. The lower run 15 is closed off at the bottom by the base plate 12, and at the top by the upper channel section part 11.

The base plate 12 projects beyond the side wall 13 toward the mineral face 16 to be won. This projecting portion 17 is inclined downwardly with respect to the base plate 12 and forms a rail along which a mineral winning plough (not shown) can slide. The rail 17 also constitutes (in a manner known per se) means for limiting the depth of cut of the plough.

An L-shaped plate 18 is welded to the side wall 13 above the rail 17. The plate 18 has a vertical arm 19, the lower part of which is welded to the side wall 13, and the upper part of which extends upwardly of the side wall 13. The plate 18 also has a horizontal arm 20 which separates an upper chain duct 21 from a lower chain duct 22. In the known manner, an endless plough drive chain (not shown) runs in the ducts 21 and 22, the plough being connected to the lower run of the chain which is guided in the duct 22. The free end of the arm 20 carries a hinge bar 23 to which is connected a ramp-shaped cover plate 24. The cover plate 24 closes off the chain ducts 21 and 22 from the face 16, a slot 25 being present below the hinge bar 23 enabling the plough to extend into the lower chain duct 22. The cover plate 24 is pivotally mounted on the hinge bar 23 to pivot, about a horizontal axis, and in the direction of the arrow S, so that it can be swung down toward the face 16 to permit access to the upper chain duct 21. When closed, the upper end of the cover plate 24 is supported on stops 26 fastened to the outer top edge of the vertical arm 19 of the plate 18. The cover plate 24 can be detachably fixed to the stops 26 by means of bolts (not shown). The ramped cover plate 24 and slide rail 17 constitute a guide for the plough. This type of plough guide is known per se.

The upper part 11 of the channel section has a base 27 which is welded to a pair of side walls 28. Alternatively, the base 27 and side walls 28 can be integrally formed. As is known, the side walls 28 are shaped to form guides 29 for the ends of the profiled scrapers (not shown). At their upper, free ends, the side walls 28 each include a horizontal flange 30. The outwardly projecting portions of the flanges 30 rest on the top edges 31 of the side walls 13 and 14 of the channel section lower part 10, and the inwardly projecting portions of these flanges help define the guides 29. The outwardly projecting portions of the flanges 30 include vertical threaded bolt-holes 32 and with downwardly projecting spigots 33. Each spigot 33 lies between two bolt-holes 32.

The upper portions 13' and 14' of the side walls 13 and 14 of the lower channel section part 10 are of reduced cross-section so that the side walls 28 of the upper part 11 fit snugly thereagainst. These reduced portions 13' and 14' include pockets 42 having undercut portions 42' and spigot-holes 34. The pockets 42 receive bolts (not shown) which pass into the bolt-holes 32, and the spigot-holes 34 mate with the spigots 33.

The upper channel section part 11 is fitted onto the lower part 10 from above, and is supported on the top edges 31 of the side walls 13 and 14 by means of the flanges 30. The spigots 33 mate with the spigot-holes 34, and bolts are inserted into the pockets 42, the heads of these bolts lying within the undercut portions 42'. The pockets 42 open onto the insides of the side walls 13 and 14 so that the bolts have to be positioned from inside the channel section. When the upper part 11 is placed in position, the bolts are scewed into their bolt-holes 32. By tightening these bolts, the upper channel section part 11 is firmly clamped to the lower part 10 with the flanges 30 bearing firmly against the top edges 31. Obviously, the positions of the spigots 33 and the spigot-holes 34 could be reversed. When connected, the bolts are concealed within the side walls 13 and 14, so there is no risk of damage to their threads.

Figure 3:
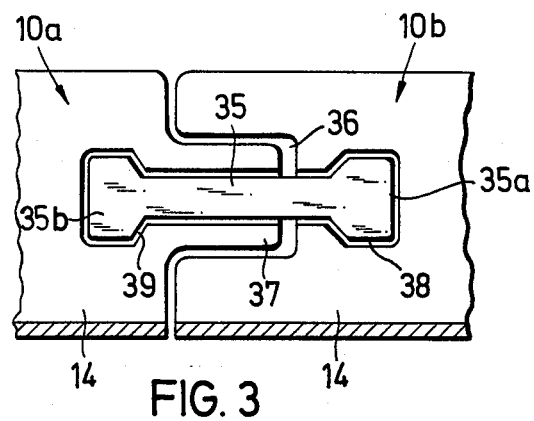
FIG. 3 is a side elevation of the lower parts of two adjacent channel sections.
Figure 4:
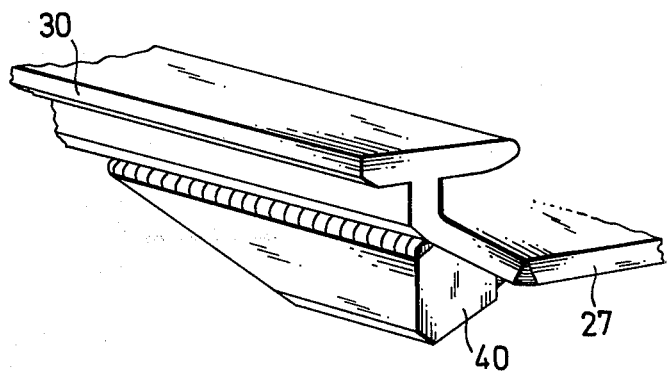
FIG. 4 is a perspective view of part of the upper portion of a channel section.

The scraper chain conveyor includes a plurality of channel sections each channel section being as described above, the channel sections being joined together end-to-end in such a manner as to permit articulation in all directions. As shown in FIG. 3, adjacent channel sections are joined together by means of respective "dog-bone" connectors 35. FIG. 3 shows the side walls 14 of the lower parts 10a and 10b of two adjacent channel sections together with the connector 35. The end of the side wall 14 of the lower part 10b has a recess 36 for receiving a correspondingly shaped tongue 37 formed on the adjacent end of the side wall 14 of the lower part 10a. The other end of the lower part 10b has a tongue 37 for engagement with a recess 36 of the next channel section lower part. Similarly, the other end of the lower part 10a has a recess 36. The engagement between each recess 36 and its tongue 37 is loose enough to permit limited play in both the horizontal and vertical planes. The connector 35 is inserted into pockets 38 and 39 formed in the side walls 14 of the lower channel section parts 10b and 10a. The connector 35 has head portions 35a and 35b which mate with correspondingly shaped portions of the pockets 38 and 39. The head portions 35a and 35b of the connector 35 are interconnected by a shank portion of reduced cross-section. This type of "dog-bone" connector is known per se. The side walls 13 of the lower channel section parts 10a and 10b are also connected by means of a connector 35 which fits within pockets 38 and 39. The pockets 38 and 39 open onto the insides of the side walls 13 and 14, so that the connectors 35 are insertable only from inside the channel sections. The connectors 35 are, therefore, concealed within the side walls 13 and 14. In order to prevent the connectors 35 from falling out of their pockets 38 and 39, locking bars 40 are fixed to the underneath surfaces of the side walls 28 of the upper channel section part 10, the form and arrangement of these locking bars being shown best in FIG. 4. Once the connectors 35 have been placed in position in their pockets 38 and 39 (and prior to the tightening up of the bolts fixing the two parts 10 and 11 together) the locking bars 40 are placed, from the inside, over the pockets 38 and 39 (as shown in FIG. 2), so as to prevent the connectors falling out of their pockets. The bolts can then be tightened up to secure the upper and lower parts 11 and 10 securely together. Thus, the lower channel section parts 10 can be fastened together before the upper parts 11 are connected thereto. Similarly, the connectors 35 can be readily removed laterally from their pockets 38 and 39 after the upper channel section parts 11 have been removed from the lower parts 10.

Wear-resistant strips 41 (see FIG. 1) are detachably secured to the horizontal arms 20 of the plates 18. These strips 41 are positioned to reduce the wear on the arms 20 and can easily be replaced when worn.

The parts 12,13,14 and 17 of the lower channel section parts 10 are made of heavy-duty metal plate, whereas the parts 27 and 28 of the upper channel section parts 11 are made of relatively light, rolled metal sections. However, the heavy loads resulting from the movement of the plough along the conveyor are borne entirely by the lower channel section parts 10 (the plough guide 17,24 being supported solely by the lower parts 10). Thus, such a conveyor has great constructional stability yet has the advantages of two-part construction. Moreover, the lower run 15 of the conveyor is virtually completely closed off from the exterior, so that penetration of fine coal dust into the lower run during advance of the conveyor is substantially completely prevented. Furthermore, since the rails 17 and the plates 18 of the plough guide are rigidly attached to the lower channel section parts 10, assembly of the plough guide is considerably simpler than is the case with known conveyors. Indeed, virtually only the ramped plates 24 need to be attached when the conveyor is being assembled alongside a mine face.

I claim:
1. A scraper-chain conveyor comprising:
   (a) a plurality of channel sections joined together end-to-end,
   (b) each channel section comprises a lower, trough-shaped part and an upper, trough-shaped part detachably connected to the lower part,
   (c) the lower part including a pair of side walls connected together and a plough guide section,
   (d) connectors associated with the side walls of the lower parts articulatedly join each pair of adjacent channel sections,
   (e) each connector is housed in correspondingly shaped pockets formed in the adjacent portions of the respective side walls of the respective lower parts,
   (f) each upper part including two bars running respectively along the under side of its side walls and overlying the pockets to hold the connectors in position housed in the pockets.
2. A scraper-chain conveyor comprising:
   (a) a plurality of channel sections joined together end-to-end,
   (b) each channel section comprises a lower, trough-shaped part and an upper, trough-shaped part detachably connected to the lower part,
   (c) the lower part includes a pair of side walls fixedly connected together and a plough guide section,
   (d) connectors articulatedly join the juxtaposed side walls of each pair of adjacent channel sections,
   (e) each connector is housed in correspondingly shaped pockets formed in the adjacent portions of the respective side walls of the respective lower parts of the adjacent channel sections,
   (f) said pockets open toward the inside of the channel sections.
3. A scraper-chain conveyor according to claim 2, wherein locking means located inside the channel sections hold the connectors in position.
4. A scraper-chain conveyor according to claim 2, wherein each connector includes a central shank portion having an enlarged head portion at each end thereof.
5. A scraper-chain conveyor channel section comprising:
   (a) a lower, trough-shaped part and an upper, trough-shaped part detachably connected to the lower part,
   (b) the lower part including a plough guide section and a pair of side walls having upper edges,
   (c) the upper part including a pair of side walls fixedly connected to a floor plate,
   (d) the side walls of the upper part having upper, free ends with outwardly-extending flanges which rest on the upper edges of the side walls of the lower part,
   (e) co-operable members are associated with the outwardly-extending flanges of the upper part and with the side walls of the lower part and detachably connect the upper part to the lower part,
   (f) pockets formed in the side walls of the lower part open toward the inside of the channel section and house said co-operable members, and
   (g) the side walls of the upper part cover said pockets when the upper part is connected to the lower part.
6. A scraper-chain conveyor channel section comprising:
   (a) a lower, trough-shaped part and an upper, trough-shaped part detachably connected to the lower part,
   (b) the lower part including a pair of side walls fixedly connected to a base plate, and
   (c) a plough guide section including an extension of said base plate which extends outwardly beyond one of said side walls,
   (d) said plough guide section including a guide member fixedly attached to the lower part and located above said base plate extension.
7. A channel section according to claim 6, wherein the side walls are welded to the base plate.
8. A channel section according to claim 7, wherein the guide member includes an L-shaped plate having one arm welded to said one side wall and the free end of the other arm pivotally attached to a ramped cover plate.
9. A channel section according to claim 8, wherein the L-shaped plate is a heavy-duty metal plate.
10. A channel section according to claim 7, wherein the base plate and the side walls of the lower part are made of heavy-duty metal plate.
11. A channel section according to claim 7, wherein the upper part includes a pair of side walls connected to a floor plate.
12. A channel section according to claim 11, wherein the side walls of the upper part are welded to the floor plate.
13. A channel section according to claim 11, wherein the upper part is made of light, rolled metal sections.
14. A channel section according to claim 11, wherein the side walls of the upper part have upper, free ends with outwardly-extending flanges which rest on the side walls of the lower part.
15. A channel section according to claim 14, wherein co-operable members are associated with the outwardly-extending flanges of the upper part and with the side walls of the lower part and detachably connect the upper part to the lower part.
16. A channel section according to claim 15, wherein at least some of said co-operable members comprise bolts associated with the side walls of the lower part and threaded holes formed in the outwardly-extending flanges of the upper part.
17. A channel section according to claim 15, wherein said co-operable members include bolts housed in pockets formed in the side walls of the lower part.
18. A channel section according to claim 15, wherein said co-operable members include spigots projecting downwardly from said flanges and spigot-holes formed in the side walls of the lower part.

* * * * *